(12) United States Patent
Huang et al.

(10) Patent No.: US 10,023,065 B2
(45) Date of Patent: Jul. 17, 2018

(54) ELECTRICAL SYSTEM ENHANCER

(71) Applicant: SMART START TECHNOLOGY PTY LTD, Kingsgrove NSW (AU)

(72) Inventors: Ricky Zhong Huang, Kingsgrove (AU); Jing K. Tan, Kingsgrove (AU)

(73) Assignee: SMART START TECHNOLOGY PTY LTD, Kingsgrove NSW (AU)

( * ) Notice: Subject to any disclaimer, the term of this patent is extended or adjusted under 35 U.S.C. 154(b) by 239 days.

(21) Appl. No.: 15/038,622

(22) PCT Filed: Nov. 25, 2014

(86) PCT No.: PCT/AU2014/001072
§ 371 (c)(1),
(2) Date: May 23, 2016

(87) PCT Pub. No.: WO2015/074108
PCT Pub. Date: May 28, 2015

(65) Prior Publication Data
US 2016/0297317 A1    Oct. 13, 2016

(30) Foreign Application Priority Data
Nov. 25, 2013   (AU) ................. 2013263700

(51) Int. Cl.
*H02J 7/00* (2006.01)
*B60L 11/18* (2006.01)
*H02J 7/34* (2006.01)

(52) U.S. Cl.
CPC ......... *B60L 11/1861* (2013.01); *H02J 7/0003* (2013.01); *H02J 7/0021* (2013.01); *H02J 7/0047* (2013.01); *H02J 7/345* (2013.01)

(58) Field of Classification Search
USPC ................................. 320/109, 167
See application file for complete search history.

(56) References Cited

U.S. PATENT DOCUMENTS 5,448,180 A   9/1995   Kienzler et al.
5,448,561 A   9/1995   Kaiser et al.
(Continued)

FOREIGN PATENT DOCUMENTS

WO   2013/138380 A2   9/2013

OTHER PUBLICATIONS

International Search Report (ISR) dated Feb. 25, 2015 for International Application No. PCT/AU2014/001072.
(Continued)

*Primary Examiner* — Robert Grant
(74) *Attorney, Agent, or Firm* — Ladas & Parry LLP

(57) ABSTRACT

An electrical system enhancer for an electrical system; the electrical system including a chemical storage battery; the, enhancer including an array of ultra capacitors arid an intelligent trickle charge circuit; the array of ultra capacitors controllably, switchably, electrically connectable to the chemical, storage battery under the control of the trickle charge circuit. Also disclosed is a method of enhancing performance of a vehicle electrical system by interconnecting a storage battery of the vehicle with an array of ultra capacitors; the array of ultra capacitors controllably, switchably electrically connected to the vehicle electric chemical storage battery by means of an intelligent trickle charge circuit. In a particular preferred form the trickle charge circuit includes a microprocessor programmed to connect and disconnect the chemical storage battery to and from the array of ultra capacitors under pre-defined conditions while retaining electrical connection between the battery and the trickle charged circuit.

20 Claims, 14 Drawing Sheets

(56) References Cited

U.S. PATENT DOCUMENTS

| | | | |
|---|---|---|---|
| 5,539,778 A | 7/1996 | Kienzler et al. | |
| 5,572,658 A | 11/1996 | Mohr et al. | |
| 7,015,674 B2 | 3/2006 | VonderHaar | |
| 7,471,068 B2 * | 12/2008 | Cegnar | H02J 7/0018 320/167 |
| 2012/0068669 A1 | 3/2012 | Trainor et al. | |

OTHER PUBLICATIONS

Written Opinion of the International Searching Authority (WO) dated Feb. 25, 2015 for International Application No. PCT/AU2014/001072.

* cited by examiner

| Percentage Charge of Battery | 12V Battery Voltage |
|---|---|
| 100 | 12.7 |
| 75 | 12.4 |
| 50 | 12.2 |
| 25 | 12.0 |
| Discharged | 11.9 |

Fig. 2

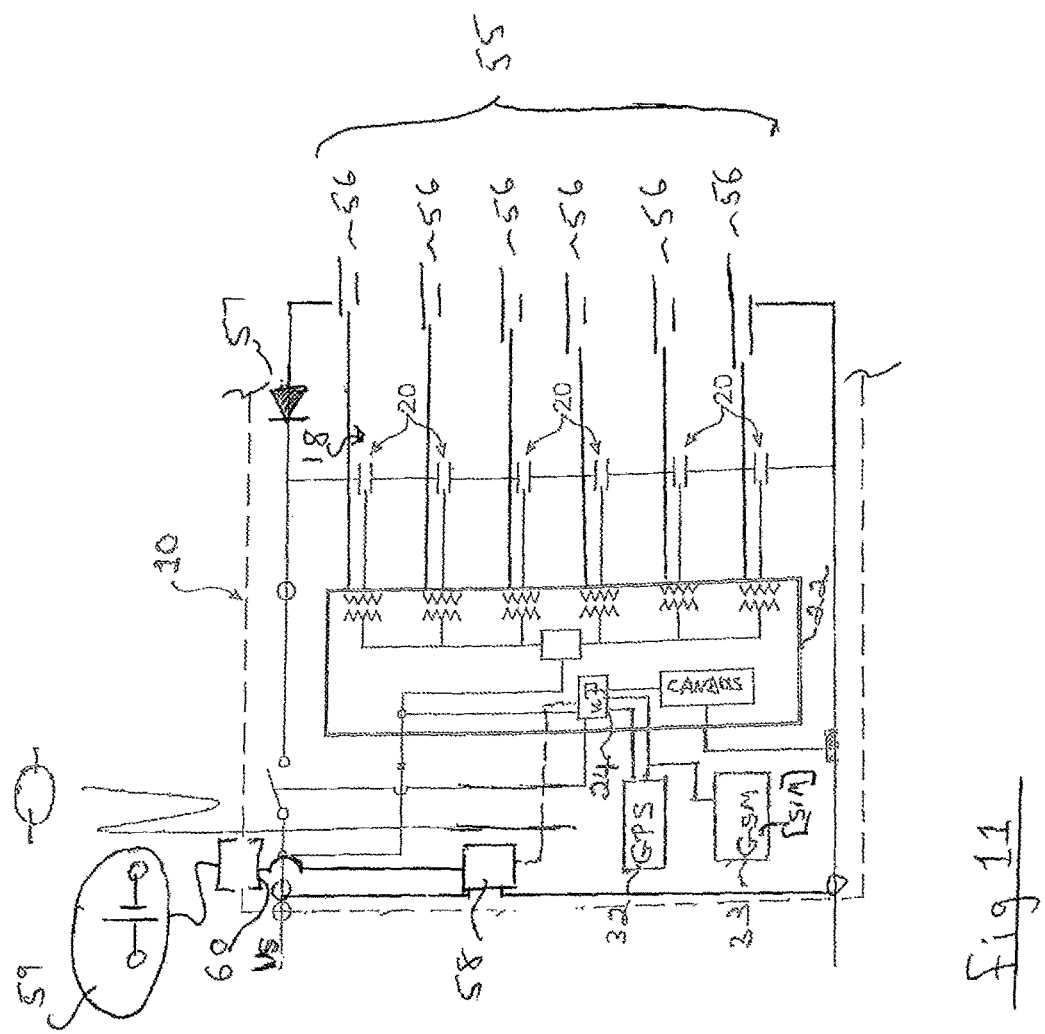

ELECTRICAL SYSTEM ENHANCER

CROSS REFERENCE TO RELATED APPLICATIONS

This application is a national stage entry under 35 U.S.C. 371 of International Application No. PCT/2014/001072 filed on Nov. 25, 2014, which claims the benefit of AU 2013263700 filed on Nov. 25, 2013, the entire contents of which are incorporated herein by reference.

TECHNICAL FIELD

The present invention relates to electrical power storage systems and, more particularly to the use of ultra capacitors forming part of an enhancer module intended, although not exclusively, to supplement or enhance as needed the electrical system of a vehicle.

BACKGROUND

Ultra capacitors, sometimes referred to as super capacitors or double-layer capacitors, are capacitors with very high energy densities compared to that of conventional capacitors and very high power density compared to conventional lead acid batteries—refer to FIG. 1.

In recent years, motor vehicles have become fitted with more and more ancillary electrical devices, such as power windows, seating, satellite navigation, high powered audio systems, stability control and power steering. Some of these may be active or on call while the vehicle's engine is inoperative and the standard vehicle battery is not receiving a charge from the alternator. Some advanced luxury vehicles now require the installation of a heavy large battery in the luggage compartment to handle these extra power demands.

It is a disadvantage of conventional vehicle batteries that in some operating conditions there may then be insufficient capacity in the battery to effectively drive the vehicle's starter motor.

Another disadvantage of conventional vehicle batteries, typically lead acid batteries, is their loss of capacity in very low ambient temperatures. This is in contrast to ultra capacitors in which loss of capacity at comparative low temperatures is relatively insignificant.

There is a series of US patents assigned to Midtronics Inc including U.S. Pat. No. 7,015,674 which cover various aspects of booster packs based on capacitor storage technology for assisting the starting of a vehicle whose conventional battery has become depleted. Embodiments of the present application seek to provide a more efficient arrangement and, in some aspects, a system more suited for integration into modern, electronically controlled vehicles.

It is also the case that some vehicles now actually stop the internal combustion engine for short periods as a means of improving fuel efficiency. It is also the case that some vehicles now include electric motor assist whereby the internal combustion engine is stopped whilst the electric motor functions to propel the vehicle. The end result is an increased number of internal combustion engine start cycles putting additional pressure on conventional electrochemical battery-based arrangements for the starting of the vehicle's internal combustion engine.

It is an object of the present invention to address or at least ameliorate some of the above disadvantages or provide a useful alternative.

Notes

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

SUMMARY OF INVENTION

Definitions

In this specification the following terms have the meanings indicated:

Ultracapacitor: Ultra capacitors, sometimes referred to as super capacitors or double-layer capacitors, are capacitors with very high energy densities compared to conventional capacitors and very high power density compared to conventional electrochemical batteries such as the lead acid battery. These characteristics, when properly configured and sized, enable them to deliver bursts of high amperage current over short time spans at low internal resistance sufficient to operate for example the starter motor of an internal combustion (IC) engine.

Conventional or Battery or chemical storage battery: an electrochemical storage device not including or having any significant inherent capacitive storage component. In the case of the car industry a battery has been required in conjunction with the internal combustion engine to power the electrics of the vehicle when the internal combustion engine is off (and hence the alternator driven by the internal combustion engine is not being driven) and also for powering of the starter motor (which in any event requires significantly more current than the alternator system is designed to provide). Up until very recent times most car batteries have taken the form of a lead acid battery. These batteries exhibit relatively high internal resistance. Furthermore the internal resistance tends to be a function of the charge on the battery and the current drawn from the battery as well as ambient conditions-for example temperature.

Accordingly in one broad form of the invention there is provided an electrical system enhancer for an electrical system; the electrical system including a chemical storage battery; said enhancer comprising an array of ultra capacitors and an intelligent trickle charge circuit; said array of ultra capacitors controllably, switchably, electrically connectable to the chemical storage battery under the control of the trickle charge circuit.

In yet a further broad form of the invention there is provided a method of enhancing performance of a vehicle electrical system by interconnecting a chemical storage battery of said vehicle with an array of ultra capacitors; said array of ultra capacitors controllably, switchably electrically connected to the vehicle chemical storage battery by means of an intelligent trickle charge circuit.

In yet a further broad form of the invention there is provided a method of construction of a rechargeable battery device; said rechargeable battery device having a first rechargeable power source having a first characteristic and a second rechargeable power source having a second characteristic different from said first characteristic; said first rechargeable power source including a conventional battery;

said second rechargeable power source including one or more Ultra capacitors; said method comprising:
  procuring said one or more ultra capacitors procuring said conventional battery;
  procuring a trickle charger circuit;
  mechanically associating and electrically interconnecting at least said conventional battery and said one or more ultra capacitors with said trickle charger circuit thereby to form said rechargeable battery device
  and wherein initially the trickle charger circuit maintains the battery isolated from the ultracapacitors until an initial charging sequence is instigated.

In yet a further broad form of the invention there is provided an electrical system enhancer circuit comprising:
  an array of one or more electrically connected Ultra capacitors;
  a trickle charger circuit in electrical communication with said bank of capacitors
  an electrical isolation switch controllable by the trickle charger circuit;
  said array of capacitors connectable to a storage battery via said electrical isolation switch;
  said electrical isolation switch maintained in open circuit condition by said trickle charger circuit whilst said array of capacitors are being charged by said trickle charger circuit whereby said array of capacitors are maintained in isolation from said chemical storage battery during trickle charging of said array of capacitors.

In yet a further broad form of the invention there is provided a method for substitution of a chemical storage battery in a designated application by a combined chemical storage battery and ultracapacitor combination; said method comprising
  sizing the battery for the designated application as being at a specified CCA rating (cold cranking amps);
  sizing the battery for the battery and ultra charger combination by subtracting a predetermined adjustment CCA value from the specified CCA rating so as to produce a specified battery and ultracapacitor combination CCA rating; sizing the battery for the substitute combined battery and ultracapacitor combination in accordance with the specified battery and ultracapacitor combination CCA rating;
  sizing the Ultra capacitor of the substitute battery and ultracapacitor combination according to its sustained maximum current delivery capability over a predetermined time window where the maximum current delivery is at least that of the battery for the designated application; electrically connecting said substitute battery and ultracapacitor combination so as to form the substituted battery and ultracapacitor combination;
  removing said battery from the designated application and substituting the substituted battery and ultracapacitor combination into the application by electrical connection therein to.

Preferably the trickle charge circuit includes a microprocessor programmed to connect and disconnect the chemical storage battery to and from the array of ultra capacitors under pre-defined conditions whilst retaining electrical connection between the battery and the trickle charged circuit.

Preferably said trickle charger circuit includes a processor in communication with the trickle charger wherein said electrical isolation switch allows current flow therethrough thereby to allow charging of said capacitor array by the chemical storage battery (or the vehicle electrical system electrically connected to the storage battery) when the voltage across the chemical storage battery is at or above a predetermined level in normal charge mode.

Preferably the array of ultra capacitors has a total array capacitance greater than 10 F.

Preferably said chemical storage battery and said array of ultra capacitors are electrically interconnected.

Preferably the ultra capacitors of said array of ultra capacitors are interconnected in series.

Preferably the ultra capacitors of said array of ultra capacitors receive a charge from said chemical storage battery; said charge modulated by the microprocessor and a regulator module of the trickle charge circuit.

Preferably each ultra capacitor of said array of ultra capacitors is charged individually.

Preferably the ultra capacitors of said array of ultra capacitors are charged in pairs; each said pair comprising capacitors interconnected in parallel.

Preferably said electrical system enhancer is retro-fitted for interconnection with said chemical storage battery.

Preferably said electrical system enhancer and said chemical storage battery are electrically interconnected and enclosed in a common enclosure thereby to form a smart battery.

Preferably the enhancer is utilised in a designated application.

Preferably the designated application is a vehicular application.

Preferably the vehicular application is one which includes an internal combustion engine.

Preferably the application is one of a motorcycle or small light passenger vehicle or large passenger vehicle or a truck application.

Preferably the ultracapacitor array rating is a function of the designated application.

Preferably the application is a motorbike application having a 1 L internal combustion engine or less and wherein the substitute capacitor is 20 F or more and the substitute battery is rated 10 CCA or more and wherein the predetermined adjustment CCA value is at least 50 CCA.

Preferably the application is a small light passenger vehicle application having a 2 L internal combustion engine or less and wherein the substitute capacitor is 60 F or more and the substitute battery is rated 50 CCA or more and wherein the predetermined adjustment CCA value is at least 200 CCA.

Preferably the application is a large light passenger vehicle application having a 4 L internal combustion engine or less and wherein the substitute capacitor is 80 F or more and the substitute battery is rated 150 CCA or more and wherein the predetermined adjustment CCA value is at least 350 CCA.

Preferably the application is a truck vehicle application having a 8 L internal combustion engine or less and wherein the substitute capacitor is 100 F or more and the substitute battery is rated 200 CCA or more and wherein the predetermined adjustment CCA value is at least 600 CCA.

Preferably the capacitor array is electrically connected to the chemical storage battery via a switch; said switch open circuit during trickle charging of the capacitors of the array whereby the capacitor array is charged while isolated from the chemical storage battery.

Preferably said capacitor array comprises series connected capacitors.

Preferably said capacitors of said array are super capacitors.

Preferably said capacitors of the array are ultra capacitors.

Preferably said capacitors of the array comprise dual layer capacitors.

Preferably said capacitor array comprises at least two series connected capacitors.

Preferably said capacitor array comprises an even number of capacitors.

Preferably said capacitor array comprises six series connected capacitors.

Preferably the capacitor array is rated at at least 1 F.

Preferably the capacitor array is rated at at least 10 F.

Preferably the capacitor array is rated at at least 50 F.

Preferably the capacitor array is rated at at least 100 F.

Preferably each capacitor may be formed as one or more capacitors connected in parallel.

Preferably the terminals of each capacitor making up the array are connected across a diode and coil wherein the diode and coil are connected in series thereby to permit isolated charging of each said capacitor while each said capacitor remains connected in series.

Preferably the coil is the secondary coil of a transformer.

Preferably an isolator switch is connected in series with the series connected capacitor array thereby to isolate the series connected capacitor array from a load connected across said capacitor array.

Preferably the load includes the chemical storage battery.

Preferably the load includes the chemical storage battery connected in parallel across the capacitor array.

Preferably the load includes a composite DC load connected across the capacitor array.

Preferably the composite DC load is the electrical system of a vehicle.

Preferably a relay switch is placed between the load and the battery and is controllable by the enhancer to controllably isolate the load from the battery and from the enhancer.

Preferably the enhancer includes a communication module whereby at least status of the chemical storage battery can be monitored from a chemical storage battery can be monitored from a remote location and aspects of the enhancer can be controlled from the remote location.

In a preferred form, the enhancer described above incorporates a battery stack.

Preferably, the battery stack is comprised of individual cells each of which is separately controllably chargeable by said enhancer.

Preferably, the battery stack includes a diode in series with its connection to said enhancer.

Preferably, the enhancer described above further includes an internal power supply unit adapted for releasably electrical connection to an external power source.

Preferably, the external power source is a USB power source.

Preferably, the internal power supply unit is in communication with a processor controlling the enhancer operations.

BRIEF DESCRIPTION OF DRAWINGS

Embodiments of the present invention will now be described with reference to the accompanying drawings wherein:

FIG. 2 is a table of charge versus terminal battery voltage characteristics for a typical present day vehicle lead acid battery.

FIG. 11 is a block diagram of the core module of FIG. 10 showing management of an externally located lithium battery stack.

DESCRIPTION OF EMBODIMENTS

Figure 1:
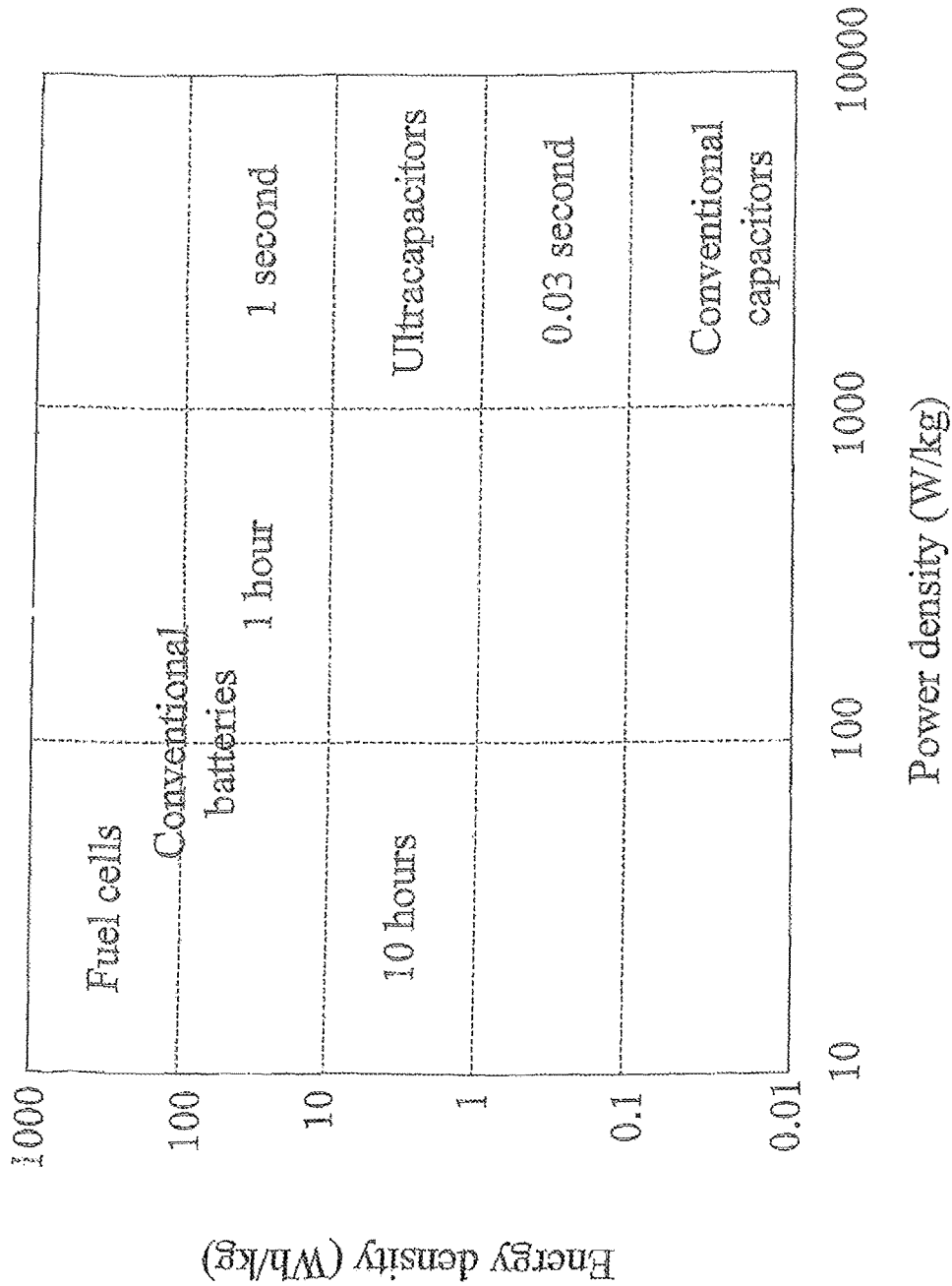
FIG. 1 is a graph of energy density versus power density comparing conventional batteries, ultra capacitors and capacitor

By way of introduction and background FIG. 1 illustrates graphically that the power density of typical, modern day ultra capacitors is several orders of magnitude higher than that of present-day conventional batteries. On the other hand the energy density of present-day conventional batteries is one or two orders of magnitude higher than that of present-day ultra capacitors.

Embodiments of the present invention seek to combine and take advantage of the characteristics of these two devices when both are integrated electrically into a power supply system, typically but not exclusively a power supply system designed for a vehicle such as a light passenger vehicle or a truck powered either exclusively by an internal combustion engine or an internal combustion engine in conjunction with an electric motor.

FIG. 2 is a table of charge versus terminal battery voltage characteristics for a typical present day vehicle lead acid battery. It will be observed that, typically, a relatively small change in battery terminal voltage leads to a significant change in the charge state of the lead acid battery. Embodiments of the present invention to be described below utilise or monitor this characteristic in the control system for the combined power source of battery and ultracapacitor combination.

Figure 3:
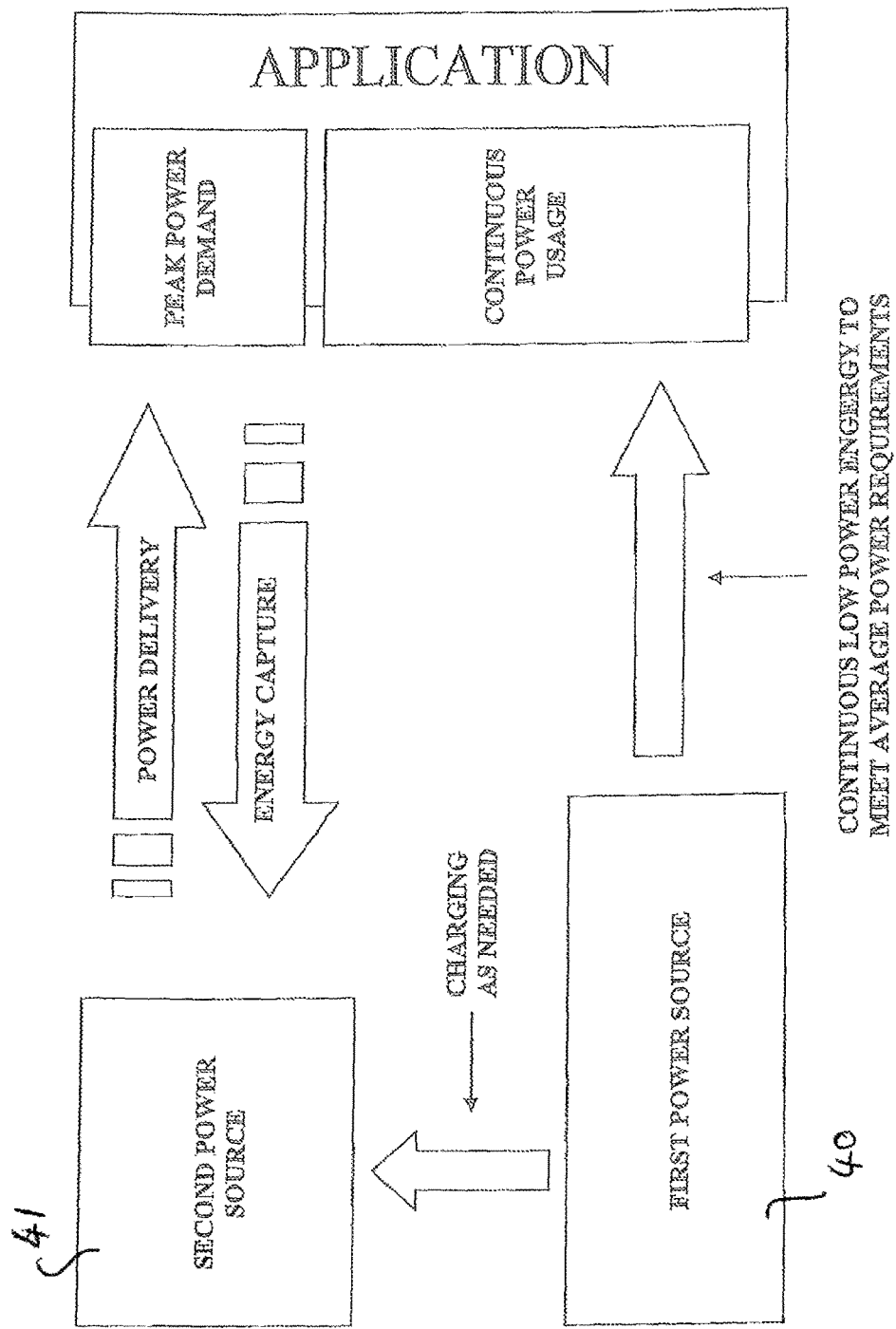
FIG. 3 is a block diagram of the power flow relationships available between two power sources of different characteristics and a load.

FIG. 3 illustrates in block diagram form the power flows available to a combination of an ultracapacitor bank 1 (representing a relatively large power density, low internal resistance power source), a primary energy source 2 (representing a relatively large energy density, relatively high internal resistance source) and a load 3 (where the load may exhibit high short-term current draw requirements but relatively low long-term current draw requirements) such as found in a vehicular load but not limited to same.

Figure 4:
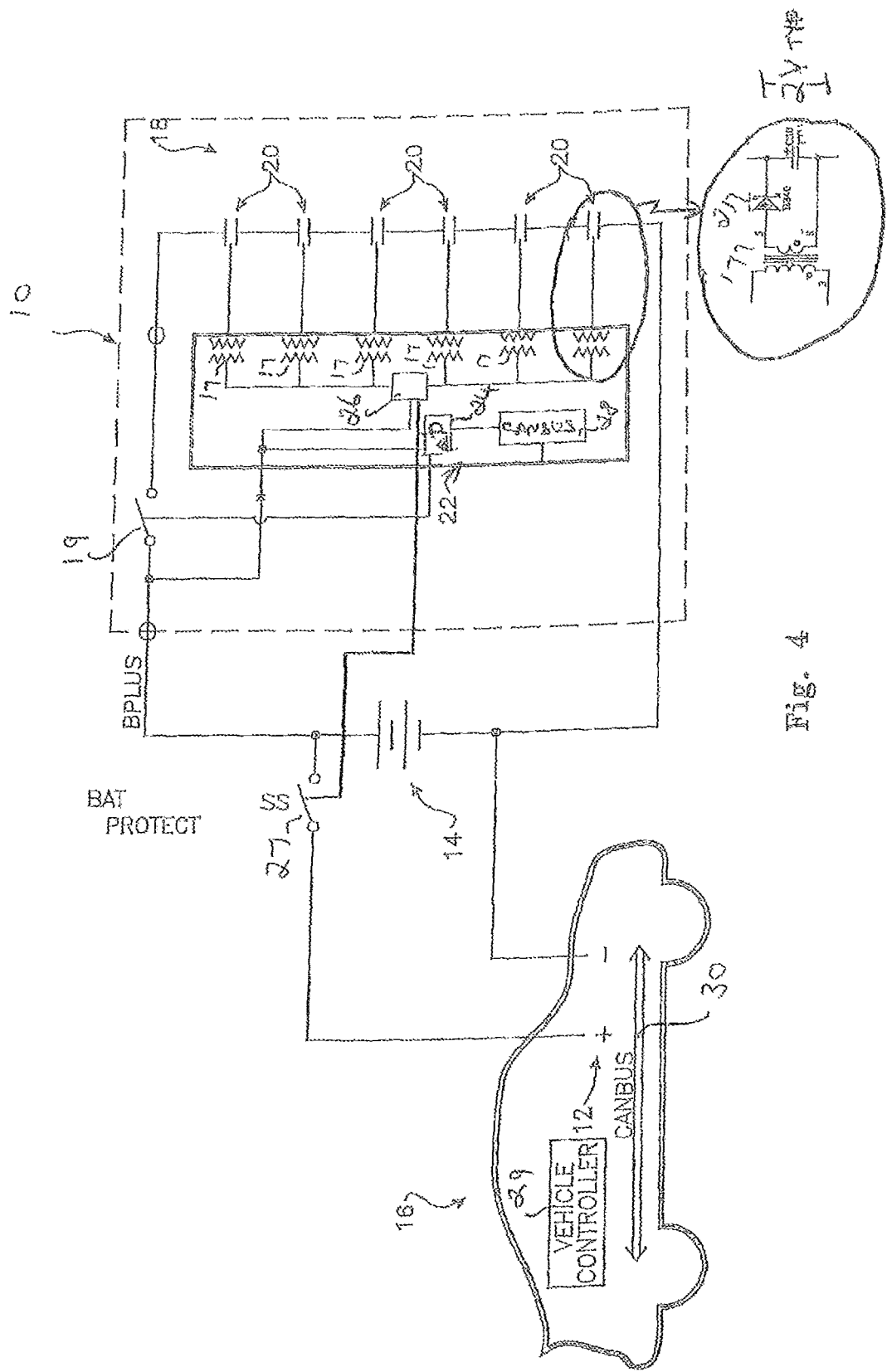
FIG. 4 is a schematic view of one version of a charging circuit for ultra capacitors forming part of a conventional battery and ultra capacitor combination.

With reference to FIG. 4, in a preferred embodiment an electrical system enhancer 10 for a motor vehicle electrical system 12 is adapted for use with a conventional chemical storage battery 14 of a vehicle 16. An array or set 18 of ultra capacitors 20 of the enhancer 10 is connected in parallel with the conventional vehicle storage battery 14 and vehicle electrical system 12.

In a preferred form the connection between the array 18 and the battery 14 includes a switch 19 by which the array is controllably, switchably, electrically connected to the battery and on to any other load which might be connected such as the vehicle electrical system 12.

The enhancer 10 is comprised of an intelligent trickle charger circuit 22 and the array 18 of ultra capacitors 20. In a preferred arrangement, an array of six ultra capacitors 20 receives a charge from the vehicle's storage battery 14 or electrical system 12 under control of the intelligent trickle charger circuit 22 and via switch 19.

The number of ultra capacitors 20 in the array 18 in the enhancer 10 is a function of the desired delivery voltage to the vehicle electrical system and the specification of the individual capacitors. For example, for a desired delivery voltage of 15V and ultra capacitors rated at 2.5V, an array of six capacitors is required, arranged in series as in the exemplary system 10.

The trickle charger circuit 22 is intelligent in that it includes a microprocessor 24 (or like programmable data-processing element) and a regulator module 26 for control of the charging process and provides for the charging of each ultra capacitor 20 individually or, in one preferred arrangement, in pairs of ultra capacitors, with each pair connected to the charger in parallel.

In this instance the controller is connected via isolation transformers 17 to each capacitor separately as illustrated, ideally via at least one diode 21 also as illustrated.

This arrangement allows that each capacitor may be charged from a relatively low voltage source (in this instance around 2.5V), so that even if the vehicle's storage battery is down to as little as 6V, the individual ultra capacitors of the enhancer can still be charged to their rated capacity whilst remaining connected in series to provide the required voltage rating of 15V for the capacitor array 18.

In a preferred mode of operation, the switch 19 is kept open whilst the trickle charger 22 is charging the capacitor array 18 thereby to disconnect the array 18 from battery 14 and the vehicle electrical system 12 (where connected). This electrical isolation permits the low voltage trickle charging of the individual capacitors 20 making up the bank 18. This arrangement is particularly advantageous if the battery 14 has become discharged. In this mode, as described further in the specification, the relay operable switch 27, where fitted, may also be in an open condition in order to isolate battery 14 from the vehicle electrical system 12.

Alternatively this may be achieved by a mechanical switching arrangement whereby the capacitors are isolated from each other for charging and then reconnected in series.

The isolation of the capacitors from the battery during charging also allows the voltage across the entire capacitor bank to be greater than that of the battery.

The enhancer system 10 of embodiments of the invention usable in an automotive context typically have the Ultra capacitors sized so as to be capable of delivering an additional current surge of between 200 and 600 Amps to the vehicle's electrical system and starter motor, ample to jump start the vehicle's engine. The vehicle's alternator may then recharge the vehicle's storage battery.

In most cases, this power surge will jump start the engine with the first capacitor charge delivery, (assuming a low battery is the only problem). Ultra capacitors are generally capable of delivering more than one power surge. However, depending on the size of the vehicle (size of its engine), a re-charge of the ultra capacitors may be required if further jump start attempts are required. Here another important advantage of ultra capacitors comes into play in that a re-charge may take as little time as a couple of minutes.

In a preferred form the electrical system enhancer 10 includes a relay operable switch 27 controlled by an output from microprocessor 24 as illustrated. Commercially the switch 27 may be termed a "smart switch". It is placed in the circuit such that it selectively connects DC supply to the motor vehicle electrical system 12 (in this instance on the far side from the battery 14 and ultracapacitor 20 supply combination). In a preferred form switch 27 is operated to disconnect electrical supply to the motor vehicle electrical system 12 in the event that the terminal voltage sensed across conventional battery 14 drops below a predetermined value. In a particular preferred, but not limiting form, the voltage can be set at or around 12.2 V DC. With reference to FIG. 2 it can be seen that this may correspond to the conventional 12V rated battery 14 being at a charge level of 50% or lower of its capacity.

In a particular form microprocessor 24 is in communication with a Canbus I/O controller 28. This provides access to data on the vehicle Canbus 30 and allows microprocessor 24 to communicate with other devices in the vehicle also connected to the Canbus of the vehicle. Typically this will include the vehicle's main vehicle controller 29 together with many peripheral devices and sensors.

CAN is a multi-master broadcast serial bus standard and protocol for connecting electronic control units (also termed ECU's). In a particular preferred form it includes priority-based bus arbitration. Under the priority-based bus arbitration system messages are given identifiers and are ranked in priority. It is the subject of a number of US patents assigned to Bosch including U.S. Pat. Nos. 5,448,180 5,448,561 5,539,778 5,572,658.

The entire text and drawings of U.S. Pat. Nos. 5,448,180, 5,448,561, 5,539,778 and 5,572,658 are incorporated herein by cross reference.

In use, in a preferred form, relay 27 is closed whereby Ultra capacitors 20 are in electrical communication with a conventional battery 14 and together they are in communication with the vehicle electrical system 12. The conventional battery 14 comprises a first rechargeable power source 40 having a first characteristic whilst the Ultra capacitors 20 collectively comprise a second rechargeable power source 41 having a second characteristic (refer FIG. 3). In this instance the two power sources work together to provide electrical power to the vehicle electrical system 12. They also work together to receive power in the form of electrical current from vehicle system 12 in certain circumstances. When in receive power mode the received power is utilised to recharge the conventional battery 14 comprising the first rechargeable power source and also to recharge the Ultra capacitors 20 comprising the second rechargeable power source under the control of the trickle charger circuit 22. Power flow can adopt a number of different modes and routes as broadly illustrated in FIG. 3.

Figure 4A:
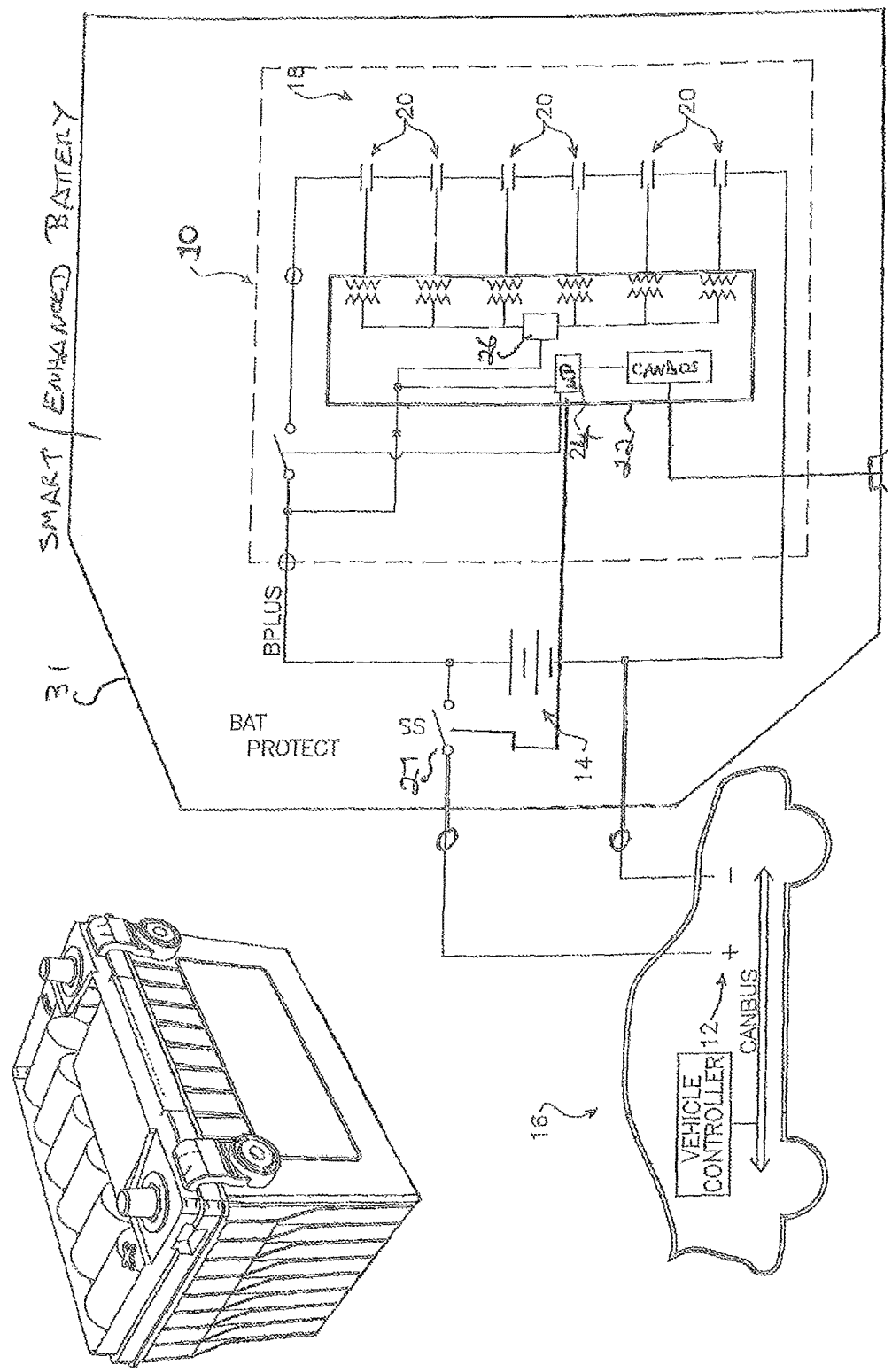
FIG. 4A is an application of the circuit of FIG. 4 as a "smart" or enhanced battery.

First Preferred Embodiment—Smart/Enhanced Battery (FIG. 4A)

In this first preferred embodiment, the electrical system enhancer 10 is comprised of a trickle charger 22 interconnected with an array of ultra capacitors 20. As described in relation to the generalised FIG. 4 embodiment, the trickle charger draws power from the vehicle's storage battery 14 to charge the ultra-capacitors via a microprocessor 24 and a regulator module 26 of the trickle charger 22.

In this embodiment, the storage battery 14, ultra capacitor array 18 and the trickle charger 22, form a single integrated unit 31 within a common enclosure to form a "smart battery".

As noted above, the enhancer is capable of adding some 200 to 600 additional amps to the available power delivery so that the incorporated storage battery can be much smaller.

Thus this arrangement allows the volume within the unit required by the storage battery component to be considerably reduced so that the size of the integrated unit need be no larger or only marginally larger than that of a conventional lead acid battery suitable for a given vehicle.

A methodology can be adopted for sizing the chemical storage battery 14 of the smart battery 31 as compared with the chemical storage battery that the smart battery replaces. Broadly, there can be a reduction in the CCA (Cold Cranking Amps) rating of the substitute battery whilst maintaining at least as good CCA performance from the smart battery 31 when compared to the chemical storage battery that it replaces. The smaller sizing of the substitute battery permits the smart battery to take up the same physical volume as the conventional stand alone chemical storage battery that it replaces. In some instances, there may be a weight reduction of the substitute smart battery unit as compared with the conventional stand alone chemical storage battery it replaces. An algorithm can be developed for the sizing of the substitute chemical storage battery comprising a CCA rating reduction factor of the substitute battery. Possible typical sizing ranges of the stand alone conventional battery and the substitute battery together with associated total capacitor bank size for different applications are given in the table below.

| Application | IC Engine Size | Conventional Battery size | Capacitor Bank size | Cranking Amps from Capacitors | Adjusted CCA of Substitute Battery |
|---|---|---|---|---|---|
| Motorbike | <1 L | >60 CCA | 20 F | 60 Amps | >10 CCA |
| Small Vehicle | <2 L | >250 CCA | 60 F | 200 Amps | >50 CCA |
| Large Vehicle | <4 L | >500 CCA | 80 F | 350 Amps | >150 CCA |
| Truck (Diesel) | <8 L | >800 CCA | 100 F | 600 Amps | >200 CCA |

It will be seen from the table that the reduction factor tends to be the order of 50 CCA and may be much higher depending on the application.

The internal combustion engine of the truck application in a preferred form may be a diesel internal combustion (IC) engine.

Figure 4B:
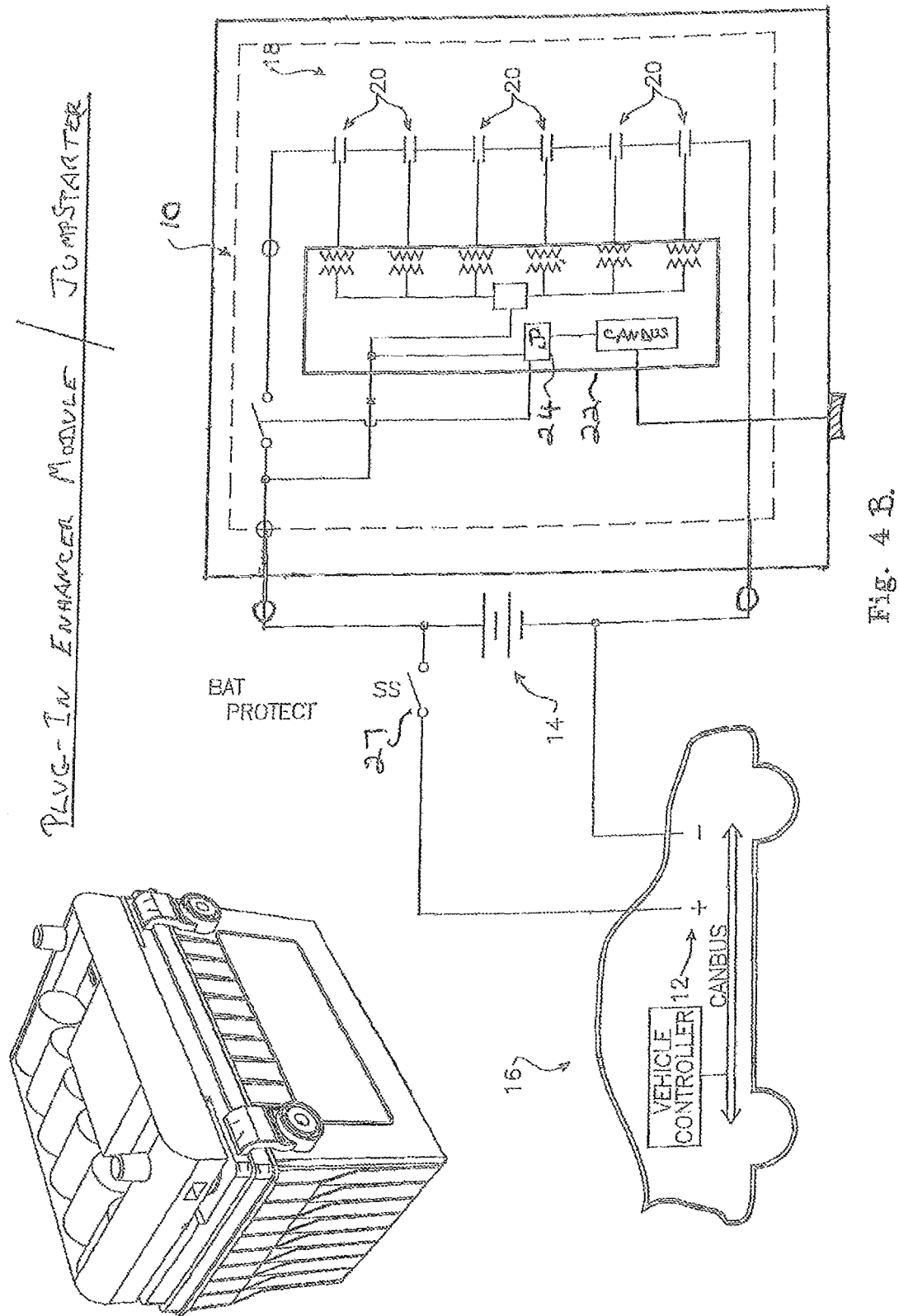
FIG. 4B is an application of the circuit of FIG. 4 as a jump starter or plug-in enhancer module.

Second Preferred Embodiment—Plug in Enhancer Module/Jump Starter (FIG. 4B)

In one preferred arrangement as illustrated in FIG. 4B, the enhancer 10 may be readily detachable from the vehicle's electrical system so as to allow its use in jumpstarting another vehicle with a low battery problem. In this way it is particularly suited to roadside assistance use.

Figure 4C:
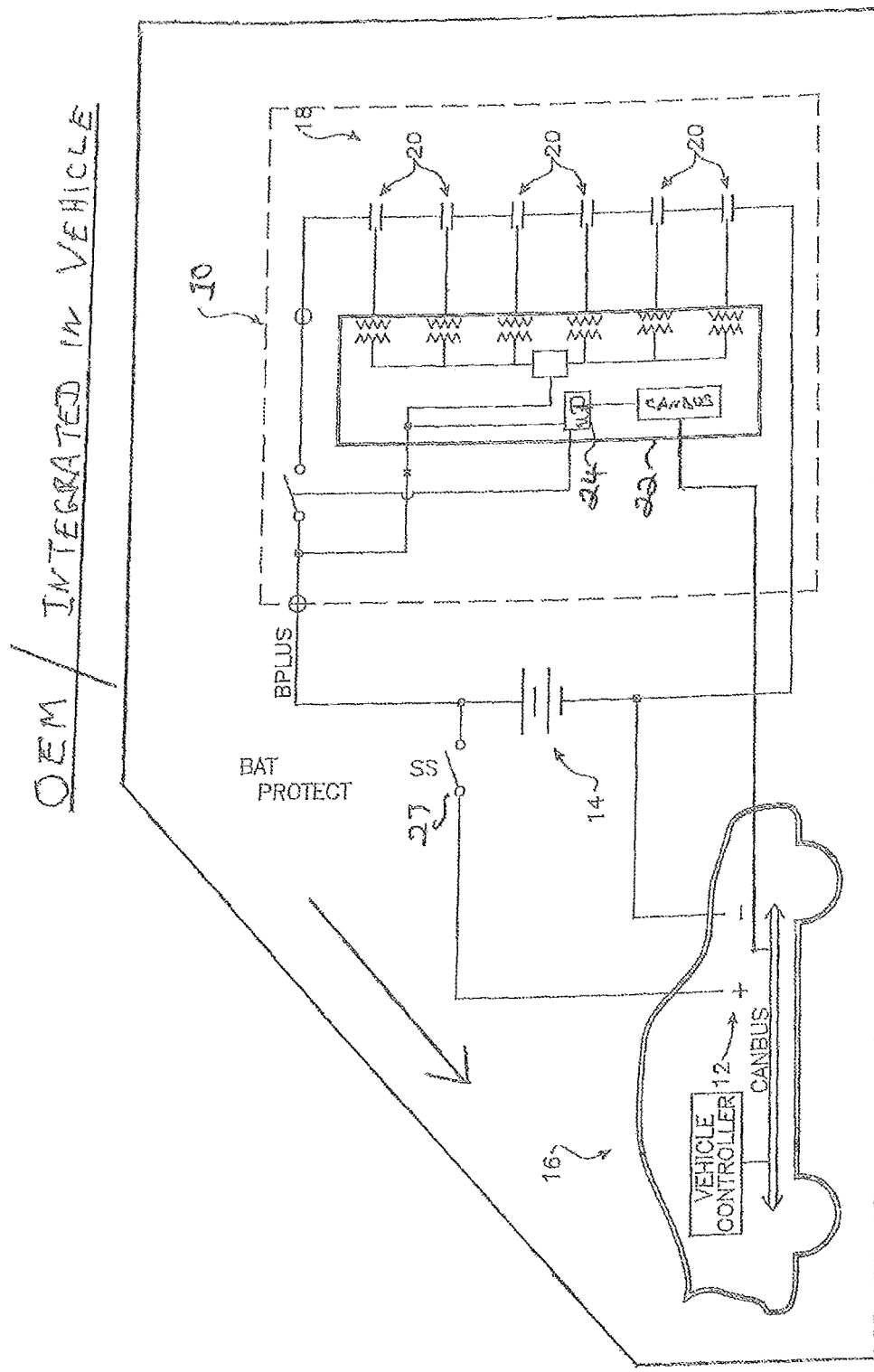
FIG. 4C is an application of the circuit of FIG. 4 integrated into a vehicle at time of manufacture.

Third Preferred Embodiment—OEM/Integrated in Vehicle (FIG. 4C)

In a third preferred embodiment, the enhancer assembly 10 may be installed in factory as the car itself is being assembled. Alternatively it may be retro-fitted to the electrical system of an existing vehicle fitted with a conventional storage battery. This retro-fitting may a "factory" refit, typically performed according to the vehicle manufacturer's specification at an authorized service centre. Alternatively, retro-fitting may be performed by a vehicle owner following instructions provided.

Figure 5:
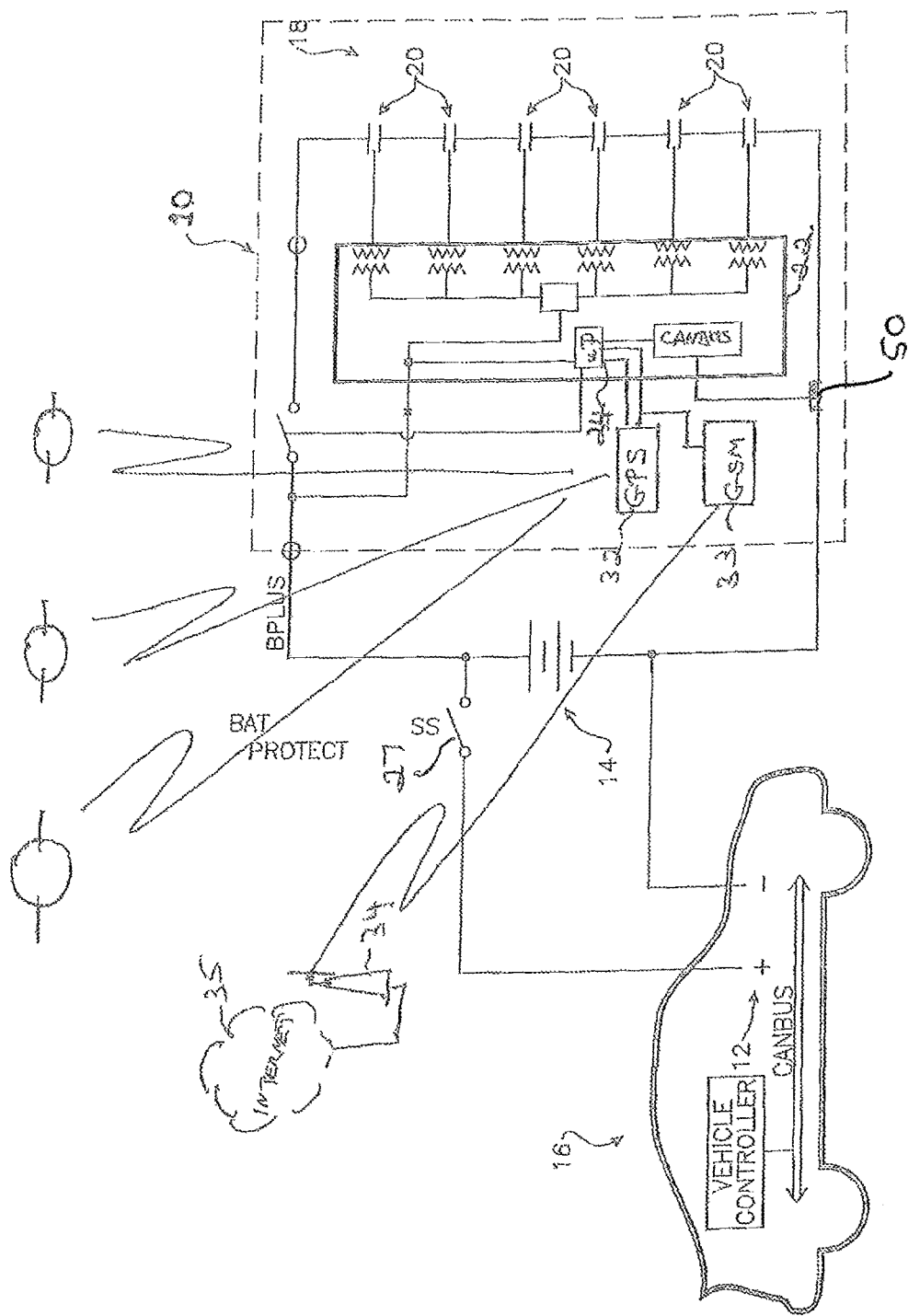
FIG. 5 is a schematic view of a further version of a charging circuit for ultra capacitors forming part of a conventional battery and ultra capacitor combination further incorporating wireless Internet connectivity and/or GPS location awareness capability.

With reference to FIG. 5, the functionality of the enhancer 10 may be supplemented by inclusion of a GPS location module 32 in communication with the microprocessor 24. It may also include a wireless communication module 33 such as a GSM module in communication with microprocessor 24 for communication over the mobile telephone network 34 to the internet 35. This arrangement will allow increased functionality of the enhancer 10 such as, for example, permitting tracking of the enhancer 10 and download of software updates for the microprocessor 24. It may also allow communication of the status of the battery 14 via the internet 35 to remote locations, for example, for the purpose of maintenance records and proactive servicing of the enhancer module 10 and more generally, the vehicle 16.

Implementation

The enhancer 10 including the trickle charger circuit 22 of the system charges the ultra capacitors of the system by drawing power from the vehicle's storage battery 14, even when the battery is discharged to as little as 6V (in a 12V system). The ultra capacitor bank 18 may be charged to 15V within two or three minutes, enabling it to provide a surge of power to start the engine, after which the alternator normally charges the vehicle's conventional storage battery. Thus the system of the present invention provides a large energy buffer for when it is needed.

Manufacture

In preferred forms the arrangements of any one of FIG. 4A, 4B or 4C include the assembly of at least a capacitor bank with a trickle charger module.

In preferred forms the trickle charger and more particularly the regulator module portion thereof will include utilisation of high current capacity solid-state devices such as silicon controlled rectifiers (SCRs) or MOSFETs. These devices will need to be able to handle peak electrical currents of between 600 A and 1000 A depending on the application. In preferred forms, the regulator module 26 may comprise a currently commercially available LT3751 fly back controller. The microprocessor 24 may be implemented using a PIC24F16KA101 low power consumption microcontroller. Licensed CANBUS controller units are presently commercially available.

Summary of Ultra Capacitor Features

Very high cycle life, up to 500,000 with only 20% performance reduction,

Devoid of the charge/discharge memory effects of conventional storage batteries, Large operating temperature range from −400 C to +650 C Can be stored uncharged with very long shelf life.

Reverse polarity protection,

Solid state components, no moving parts so less wear and tear,

Light weight, the enhancer assembly of the invention can be less than 700 g,

Capable of improving vehicle audio system performance by preventing signal cut-off.

Further embodiments of the previously described system will now be described:

Cabin Control Embodiment

Figure 6:
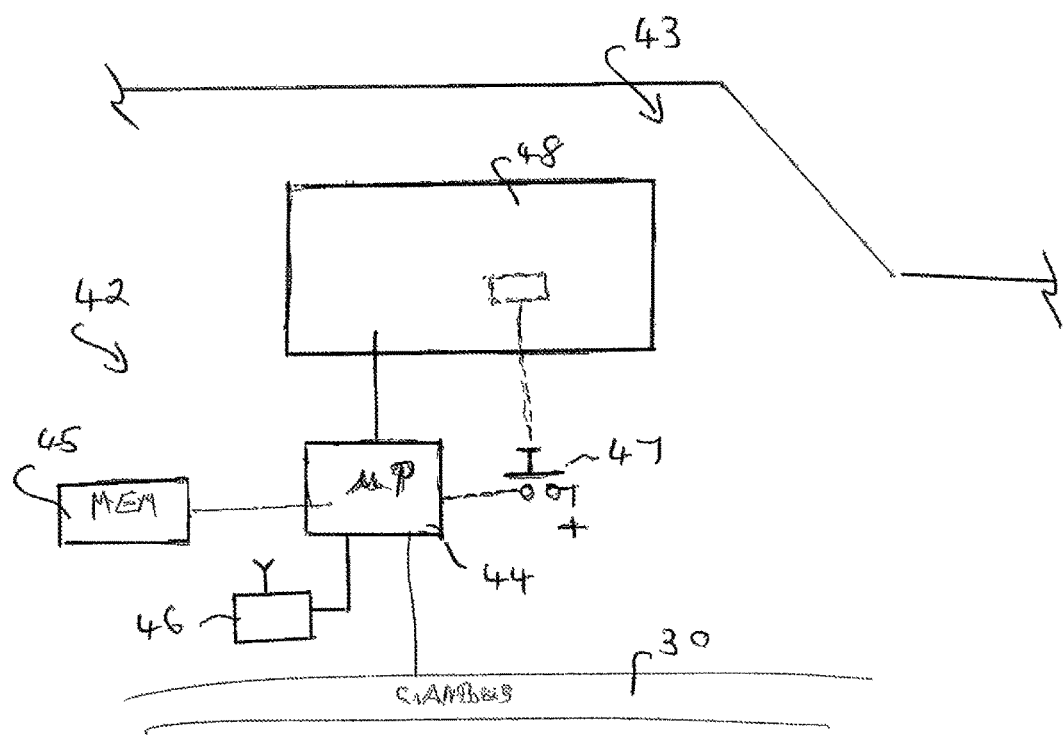
FIG. 6 is a block schematic diagram of a vehicle on-board controller for initiating enhancer control from within the cabin of a vehicle.

FIG. 6 is a block schematic diagram of a vehicle on-board controller 42 for initiating enhancer control from within the cabin 43 of a vehicle 16.

In this instance, the vehicle on-board controller 42 comprises a micro processor 44 in communication with a memory 45 and, in one form, a wireless transmitter receiver 46. In one form the processor 44 is in communication with the vehicle CANBUS 30.

The microprocessor 44 receives input from a preferably dashboard mounted switch 47. The microprocessor 44 may also be in communication with a dashboard mounted display 48. In a further particular form, the dashboard mounted display 48 may be a touch sensitive screen wherein the function of the switch 47 may be incorporated therein.

The memory 45 contains code programs to operate processor 44 whereby, in the event of a low battery voltage condition being detected, the switch 47 is enabled, upon actuation by a driver, to cause the enhancer 10 to enter into an ultra-capacitor charge mode whereby charge from the vehicle battery 14 is utilised to controllably, selectively charge the ultra-capacitors 20 typically over a 1 to 5 minute period sufficient that the bank 18 of ultra-capacitors 20 has sufficient voltage and capacity to power the vehicle's starter motor (not shown).

Communication between the microprocessor 44 within cabin 43 and the enhancer 10 (typically mounted within the engine bay of vehicle 12) may be either via wireless transmitter receiver 46 communicating with a corresponding wireless module 49 of enhancer 10 (refer FIG. 7) or via the CANBUS 30 (refer FIG. 4C)(or refer FIG. 5 via CANBUS connector 50 whereby the enhancer 10 is releasably, connectably placeable in CANBUS communication with CANBUS 30 of vehicle 16).

Near Field Wireless Control Embodiment

Figure 7:
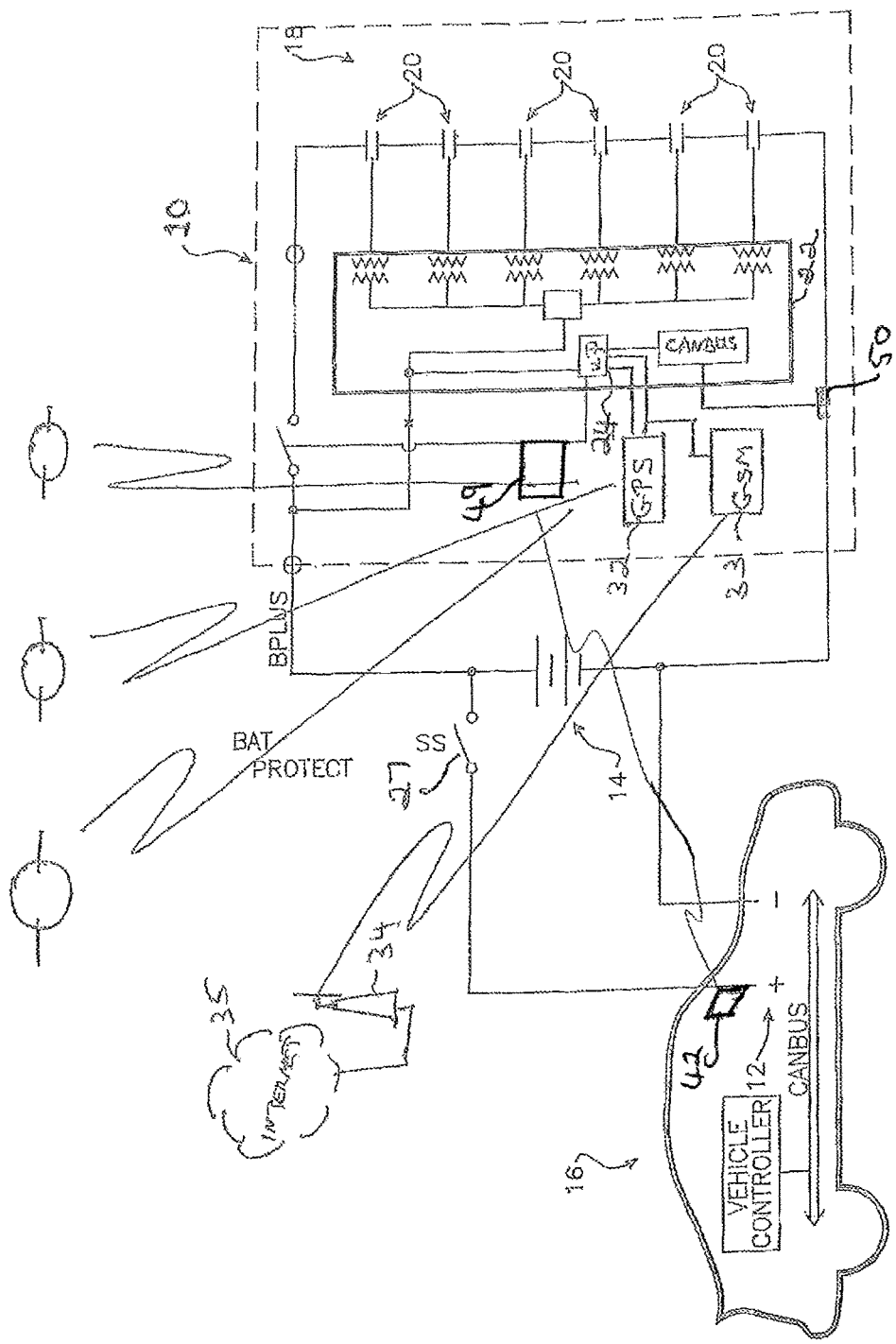
FIG. 7 is a schematic view of a further version of the charging circuit for ultra capacitors forming part of a conventional battery and ultra capacitor combination further incorporating wireless Internet connectivity and/or GPS location awareness capability, and further including near field radio communication capability.

FIG. 7 is a schematic view of a further version of the charging circuit for ultra capacitors forming part of a conventional battery and ultra capacitor combination further incorporating wireless Internet connectivity and/or GPS location awareness capability, and further including near field radio communication capability. The embodiment shown FIG. 7 incorporates all the features described with reference to FIG. 5, but, in this instance, either additionally or instead of GPS unit 32 and GSM unit 33, incorporates wireless module 49 adapted for near field wireless communication, with, for example, an onboard controller located within vehicle 16. The near field wireless communication can be based on Bluetooth technology or on Wi-Fi technology or on currently available NFC technology.

Intelligent Control Embodiment

Figure 8:
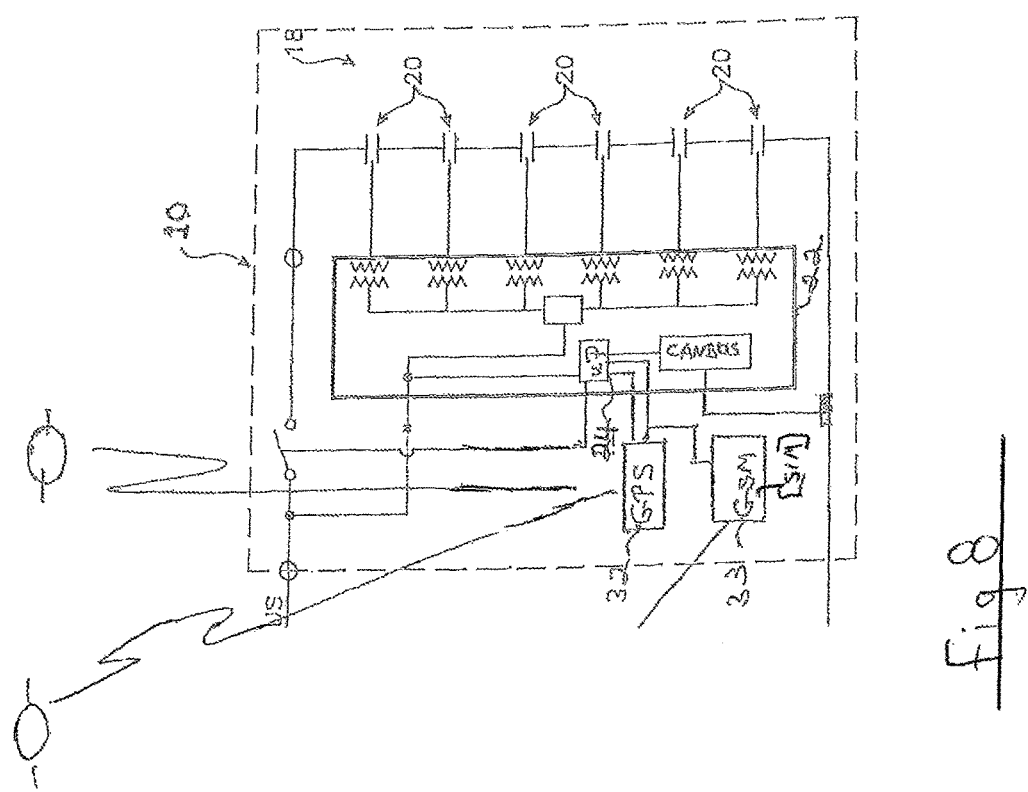
FIG. 8 is a block diagram of the core module of the enhancer forming a building block for embodiments of the system in accordance with any of the previously described embodiments.

FIG. 8 is a block diagram of the core module of the enhancer 10 forming a building block for embodiments of the system in accordance with any of the previously described embodiments. In this instance the microprocessor 24 is programmed to include functions such as:
  a. Alarm notification to the vehicle 16 and/or to external monitoring authority.
  b. Tracking of the enhancer 10 (and hence vehicle 16) by an external monitoring authority.
  c. Remote access for example by an external monitoring authority to control the enhancer 10 including to isolate it.
  d. In some embodiments, in order to communicate with an external monitoring authority, a SIM will be required to operate in conjunction with the wireless communication module 33 (for example operating over the GSM network).

Jump Start Embodiment

Figure 9:
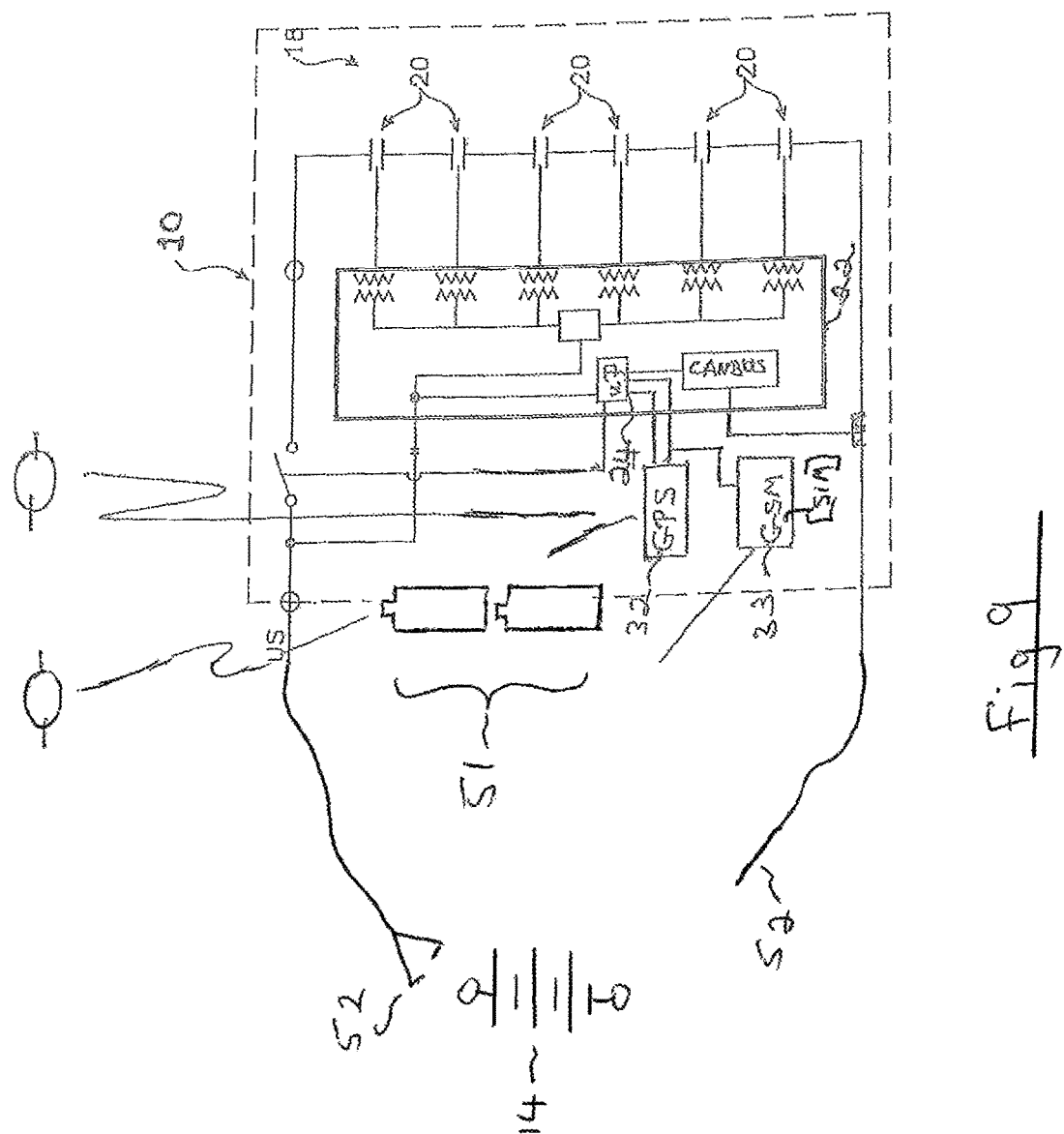
FIG. 9 is a jump start embodiment building on the core module of FIG. 8.

FIG. 9 is a jump start embodiment building on the core module of FIG. 8.

In this instance, the enhancer 10 may incorporate an internal conventional battery pack 51 which has sufficient capacity to charge the ultra-capacitor bank 18 in turn sufficient for the ultra-capacitor 20 to power the starter motor (not shown) of the vehicle 16 for at least one starting cycle. In this embodiment, the vehicle storage battery 14 remains separately within the vehicle 16. This jumpstart version of the enhancer 10 may conveniently be provided as a separate stand alone unit which can be stowed within a vehicle glove compartment or similar and will incorporate small alligator clips 52 for permitting a releasable electrical attachment to the terminals of battery 14 when battery 14 requires 'jump-starting'. Calculations indicate that the battery pack 51 for many light vehicles may comprise 2, 3 or 4 AA sized batteries which can either be supplied with the jumpstart unit or can be purchased fresh at the time of need.

External Battery Stack Management Embodiment

Figure 10:
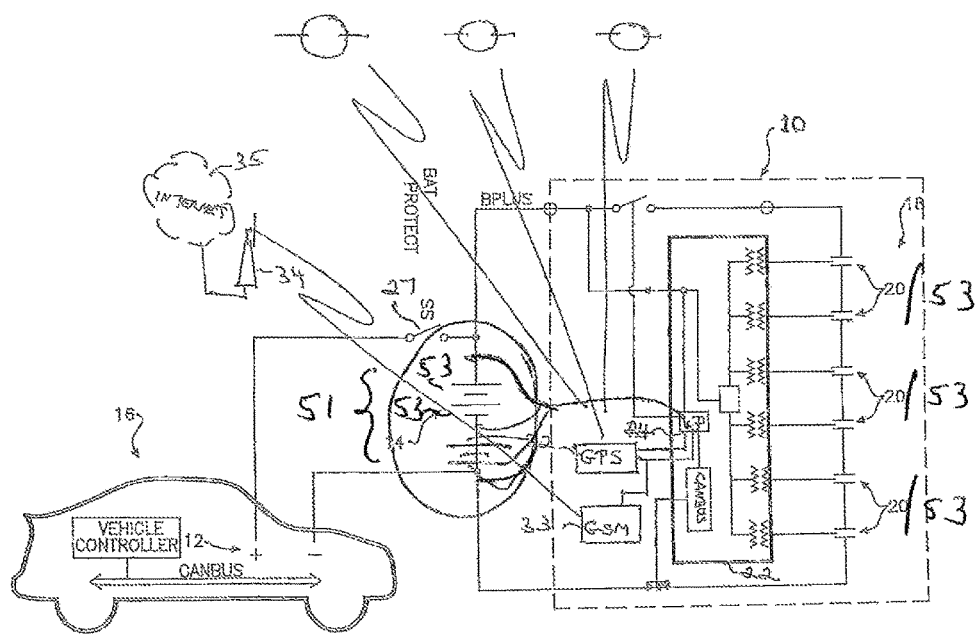
FIG. 10 is a block diagram of the core module utilised to manage externally located battery stacks.

FIG. 10 is a block diagram of the core module of enhancer 10 utilised to manage externally or internally located battery stacks.

The modularized nature of the charging control portions of the enhancer 10, particularly the multiplicity of independently driven isolator transformers 17, can be utilised to controllably charge individual cells 53 of a battery pack 51 just as well as the individual ultra capacitor cells 20 of a capacitor array 18.

This arrangement can be used with advantage to provide an enhancer 10 that can operate entirely independently of the vehicle storage battery 14. In alternative scenarios this arrangement can operate in substitution of vehicle battery 14.

Lithium Battery Stack Management Embodiment

FIG. 11 is a block diagram of the core module of FIG. 10 showing management of an externally or internally located lithium battery stack 55 comprised of a multiplicity of lithium battery cells 56, each connected across a separate isolation transformer 17. The isolation transformer 17 is in turn are driven by regulator 26 under control of microprocessor 24.

This arrangement permits individual charging of the cells 56 making up the lithium battery stack 55. In this instance an isolation diode 57 is incorporated as illustrated in FIG. 11, thereby to isolate the lithium battery stack 55 from being influenced by/charged by electrical sources external to the enhancer 10.

In forms where both capacitor bank 18 and lithium battery stack 55 are controlled by the one enhancer 10 there may need to be additional switching between the bank and the stack to allow separate controllable charging as required.

In a preferred form the lithium stack keeps the capacitor bank charged except when the lithium cells are in very weak condition.

In a particular preferred form, the stack 55 may comprise of four lithium cells each of 3.6 to 4.2 volt rating and operating on a charging cycle range of 30 to 80 percent.

In a particular form, the enhancer 10 further includes an internal power supply unit 58 adapted to receive power from an external power source 59 other than (or as an alternative to) vehicle storage battery 14. In a particular preferred form, the external power source 58 is a USB power source which can be releasably connected to enhancer 10 via socket 60.

This external source of electrical power can be used with advantage to provide a source of electrical power for either initial charging or subsequent recharging of the battery stack 55 from a low level.

In a particular form, the internal power supply unit 58 is controlled by microprocessor 24 thereby to synchronise charging operations of the enhancer 10 via regulator 26.

In a particular form, regulator 26 is a switched regulator. In a very particular form, charging of either the capacitor bank 18 or the battery stack 55 is achieved via a simple on/off cycling of the regulator 26.

Whilst the battery stack 55 has been described in this particular form utilising lithium battery technology, other forms of rechargeable battery technology can be utilised including Nickel Metal Hydride and, indeed, lead acid.

INDUSTRIAL APPLICABILITY

The incorporation of an ultra capacitor in the electrical system of a motor vehicle thus has a number of advantages. The very high power density of the ultra capacitor array of the invention provides a reliable additional power source of up to 600 Amps to drive the vehicle starter motor under conditions in which the vehicle's storage battery is unable to do so.

Integration of a chemical storage battery with an ultra capacitor array and control module within a single power supply unit, provides an enhanced vehicle electrical system with greater reliability under conditions in which a conventional lead acid battery may fail to provide sufficient power to start and operate the vehicle.

The invention claimed is:

1. A vehicle having an internal combustion engine; said internal combustion engine started by supply of power from an electrical system enhancer; said electrical system enhancer for an electrical system; the electrical system including a chemical storage battery; said enhancer comprising an array of ultra capacitors and an intelligent trickle charge circuit; said array of ultra capacitors controllably, switchably, electrically connectable to the chemical storage battery under the control of the trickle charge circuit; the enhancer including a communication module whereby at least status of the chemical storage battery can be monitored from a remote location and aspects of the enhancer can be controlled from the remote location; and wherein a substitute battery of the vehicle and the associated enhancer combination are sized in accordance with the following steps:
sizing the battery for the designated application as being at a specified CCA rating (cold cranking amps);
sizing the battery for the battery and enhancer combination by subtracting a predetermined adjustment CCA value from the specified CCA rating so as to produce a specified battery and ultracapacitor combination CCA rating; sizing the battery for the substitute combined battery and ultracapacitor combination in accordance with the specified battery and ultracapacitor combination CCA rating;
sizing the ultracapacitor of the substitute battery and ultracapacitor combination according to its sustained maximum current delivery capability over a predetermined time window where the maximum current delivery is at least that of the battery for the designated application; electrically connecting said substitute battery and ultracapacitor combination so as to form the substituted battery and ultracapacitor combination; removing said battery from the designated application and substituting the substituted battery and ultracapacitor combination into the application by electrical connection therein to.

2. The vehicle of claim 1 including, in combination, an engine controller in communication with the enhancer; said engine controller having a stop start function whereby an internal combustion engine of said vehicle controlled by said controller is caused to stop rather than idle and is restarted by supply of power substantially from said enhancer.

3. The vehicle of claim 1 wherein the trickle charge circuit includes a microprocessor programmed to connect and disconnect the chemical storage battery to and from the array of ultra capacitors under pre-defined conditions whilst retaining electrical connection between the battery and the trickle charged circuit.

4. The vehicle of claim 1 wherein said trickle charger circuit includes a processor in communication with the trickle charger wherein said electrical isolation switch allows current flow therethrough thereby to allow charging of said capacitor array by the chemical storage battery (or the vehicle electrical system electrically connected to the storage battery) when the voltage across the chemical storage battery is at or above a predetermined level in normal charge mode.

5. The vehicle of claim 1 wherein array of ultra capacitors has a total array capacitance greater than 10 F.

6. The vehicle of claim 1 wherein said chemical storage battery and said array of ultra capacitors are electrically interconnected.

7. The vehicle of claim 1 wherein ultra capacitors of said array of ultra capacitors are interconnected in series.

8. The vehicle of claim 1 wherein ultra capacitors of said array of ultra capacitors receive a charge from said chemical storage battery; said charge modulated by the microprocessor and a regulator module of the trickle charge circuit.

9. The vehicle of claim 1 wherein each ultra capacitor of said array of ultra capacitors is charged individually.

10. The vehicle of claim 1 wherein ultra capacitors of said array of ultra capacitors are charged in banks.

11. The vehicle of claim 1 wherein said electrical system enhancer is retro-fitted for interconnection with said chemical storage battery.

12. The vehicle of claim 1 wherein said electrical system enhancer and said chemical storage battery are electrically interconnected and enclosed in a common enclosure thereby to form a smart battery.

13. The vehicle of claim 1 wherein the capacitor array is electrically connected to the chemical storage battery via a switch; said switch open circuit during trickle charging of the capacitors of the array whereby the capacitor array is charged while isolated from the chemical storage battery.

14. The vehicle of claim 1 wherein a relay switch is placed between the load and the battery and is controllable by the enhancer to controllably isolate the load from the battery and from the enhancer.

15. A method for substitution of a chemical storage battery in a designated application by a combined chemical storage battery and ultracapacitor combination; said method comprising
sizing the battery for the designated application as being at a specified CCA rating (cold cranking amps);
sizing the battery for the battery and ultra charger combination by subtracting a predetermined adjustment CCA value from the specified CCA rating so as to produce a specified battery and ultracapacitor combination CCA rating; sizing the battery for the substitute combined battery and ultracapacitor combination in accordance with the specified battery and ultracapacitor combination CCA rating;

sizing the Ultra capacitor of the substitute battery and ultracapacitor combination according to its sustained maximum current delivery capability over a predetermined time window where the maximum current delivery is at least that of the battery for the designated application; electrically connecting said substitute battery and ultracapacitor combination so as to form the substituted battery and ultracapacitor combination;

removing said battery from the designated application and substituting the substituted battery and ultracapacitor combination into the application by electrical connection therein to; the battery and ultracapacitor combination further including a communication module whereby at least status of the chemical storage battery can be monitored from a remote location and aspects of the battery and ultracapacitor combination can be controlled from the remote location.

16. The method of claim 15 wherein the trickle charge circuit includes a microprocessor programmed to connect and disconnect the chemical storage battery to and from the array of ultra capacitors under pre-defined conditions whilst retaining electrical connection between the battery and the trickle charged circuit.

17. The method of claim 15 wherein said trickle charger circuit includes a processor in communication with the trickle charger wherein said electrical isolation switch allows current flow therethrough thereby to allow charging of said capacitor array by the chemical storage battery (or the vehicle electrical system electrically connected to the storage battery) when the voltage across the chemical storage battery is at or above a predetermined level in normal charge mode.

18. The method of claim 15 wherein the array of ultra capacitors has a total array capacitance greater than 10 F.

19. The method of claim 15 wherein said chemical storage battery and said array of ultra capacitors are electrically interconnected.

20. The method of claim 15 wherein ultra capacitors of said array of ultra capacitors are interconnected in series.

* * * * *